United States Patent
Ganjam et al.

(10) Patent No.: US 9,866,927 B2
(45) Date of Patent: Jan. 9, 2018

(54) IDENTIFYING ENTITIES BASED ON SENSOR DATA

(71) Applicant: Microsoft Technology Licensing, LLC, Redmond, WA (US)

(72) Inventors: Kris Ganjam, Redmond, WA (US); David Douglas DeBarr, Lynnwood, WA (US); Navendu Jain, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/135,828

(22) Filed: Apr. 22, 2016

(65) Prior Publication Data

US 2017/0311053 A1  Oct. 26, 2017

(51) Int. Cl.
- *G08C 19/22* (2006.01)
- *H04Q 9/00* (2006.01)
- *H04L 29/08* (2006.01)
- *G06F 17/30* (2006.01)

(52) U.S. Cl.
CPC ......... *H04Q 9/00* (2013.01); *G06F 17/30525* (2013.01); *G06F 17/30528* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 6,691,032 B1 | 2/2004 | Irish et al. | |
| 7,139,779 B1 | 11/2006 | Kornelson et al. | |
| 7,653,702 B2 | 1/2010 | Miner | |
| 8,386,929 B2 | 2/2013 | Zaika et al. | |
| 8,818,026 B2 | 8/2014 | Kiyohara et al. | |

(Continued)

FOREIGN PATENT DOCUMENTS

| WO | 2003073417 A2 | 9/2003 |
|---|---|---|
| WO | 2010090621 A1 | 8/2010 |
| WO | 2014172054 A2 | 10/2014 |

OTHER PUBLICATIONS

Fano, Andrew E., "Shopper's Eye: Using Location-based Filtering for a Shopping Agent in the Physical World", In Proceedings of Second International Conference on Autonomous Agents, May 1, 1998, pp. 416-421.

(Continued)

*Primary Examiner* — Adolf Dsouza

(74) *Attorney, Agent, or Firm* — Jonathan M. Waldman

(57) ABSTRACT

Sensor data from multiple sensors associated with a user is received. The sensors may include sensors of a smart phone, and sensors associated with other devices such as fitness trackers, video game consoles, and cameras. The sensor data is processed to identify entities such as persons, locations, and objects that may be of interest to the user. A personal digital assistant application can present information related to the identified entities to the user, and can allow the user to perform various queries with respect to the identified entities, and previously identified entities. In addition, the identified entities can be used to trigger one or more rules including recording when and where a particular entity is identified, and generating an alert when a particular entity is identified.

20 Claims, 12 Drawing Sheets

(56) References Cited

U.S. PATENT DOCUMENTS

| | | |
|---|---|---|
| 9,081,411 B2 | 7/2015 | Kalns et al. |
| 9,190,075 B1 | 11/2015 | Cronin |
| 2008/0131851 A1 | 6/2008 | Kanevsky et al. |
| 2012/0035924 A1 | 2/2012 | Jitkoff et al. |
| 2012/0166417 A1* | 6/2012 | Chandramouli .. G06F 17/30516 707/713 |
| 2012/0265528 A1 | 10/2012 | Gruber et al. |
| 2014/0218372 A1 | 8/2014 | Missig et al. |
| 2014/0310595 A1* | 10/2014 | Acharya ............... G06F 9/4446 715/706 |
| 2015/0162000 A1 | 6/2015 | Di Censo et al. |
| 2015/0254279 A1 | 9/2015 | Boncyk et al. |

OTHER PUBLICATIONS

"International Search Report and Written Opinion Issued in PCT Application No. PCT/US2017/027840", dated Sep. 11, 2017, 11 Pages.

* cited by examiner

IDENTIFYING ENTITIES BASED ON SENSOR DATA

BACKGROUND

Users have become accustomed to interacting with devices such as smart phones and tablet computers using personal digital assistant applications. Typically, users speak or type a question to their device e.g., to do a web search, and the personal digital assistant application associated with their device attempts to answer the question by searching the Internet, or by searching a calendar or contacts associated with the user of the device.

While such personal digital assistant applications are useful, they fail to take advantage of the wealth of data available to modern devices. For example, modern devices often include numerous sensors such as cameras, microphones, global positioning systems, accelerometers, barometers, etc. In addition, device users may be associated with additional devices such as fitness trackers, smart watches, home security systems, smart televisions, video game consoles, etc., and each device may be associated with its own set of sensors.

While the sensor data provided from the numerous sensors is capable of providing valuable information and insights to the user, there is currently no way for the user to search, integrate, or analyze this data using the personal digital assistant applications that they are familiar with.

Further, the current digital assistant applications are primarily reactive in nature. While users can set up alarms or reminders based on temporal events, these applications wait for the user to initiate a command/query and thus they do not proactively perform any actions.

SUMMARY

Sensor data from multiple sensors associated with a user is received. The sensors may include sensors of one or more devices including smart phones, fitness trackers, video game consoles, and security cameras. The sensor data is processed to identify entities such as persons, locations, and objects that may be of interest to the user. A personal digital assistant application can present information related to the identified entities to the user, and can allow the user to perform various tasks with respect to the identified entities, and previously identified entities. In addition, the identified entities can be used to trigger one or more rules including recording when and where a particular entity is identified, and generating an alert, or related information, when a particular entity is identified.

In an implementation, a system for automatically identifying entities based on sensor data and for performing one or more actions based on the identified entities is provided. The system includes at least one computer and an entity engine. The entity engine is adapted to store a plurality of rules. Each rule is associated with an entity and an action. The entity engine is further adapted to: receive sensor data from a plurality of sensors; identify a plurality of entities from the sensor data; determine one or more rules of the plurality of rules that match an entity of the plurality of entities; and perform the action associated with at least one of the determined one or more rules.

In an implementation, a system for automatically identifying entities based on sensor data and for providing attributes based on the identified entities is provided. The system includes at least one computer and an entity engine. The entity engine is adapted to: receive sensor data from a plurality of sensors of a device; identify a plurality of entities from the sensor data; determine an entity of interest of the plurality of entities; determine attributes associated with the entity of interest; and display one or more of the determined attributes on the device.

In an implementation, a method for automatically identifying entities based on sensor data and for determining attributes associated with the identified entities is provided. The method includes collecting sensor data from one or more sensors of a plurality of sensors associated with a device by the device; identifying a plurality of entities from the sensor data by the device; receiving user input by the device; determining one or more entities of interest from the plurality of entities based on the received user input by the device; determining a query based on the received user input by the device; determining attributes associated with one or more entities of interest based on the query by the device; and displaying one or more attributes of the determined attributes on a display associated with the device by the device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
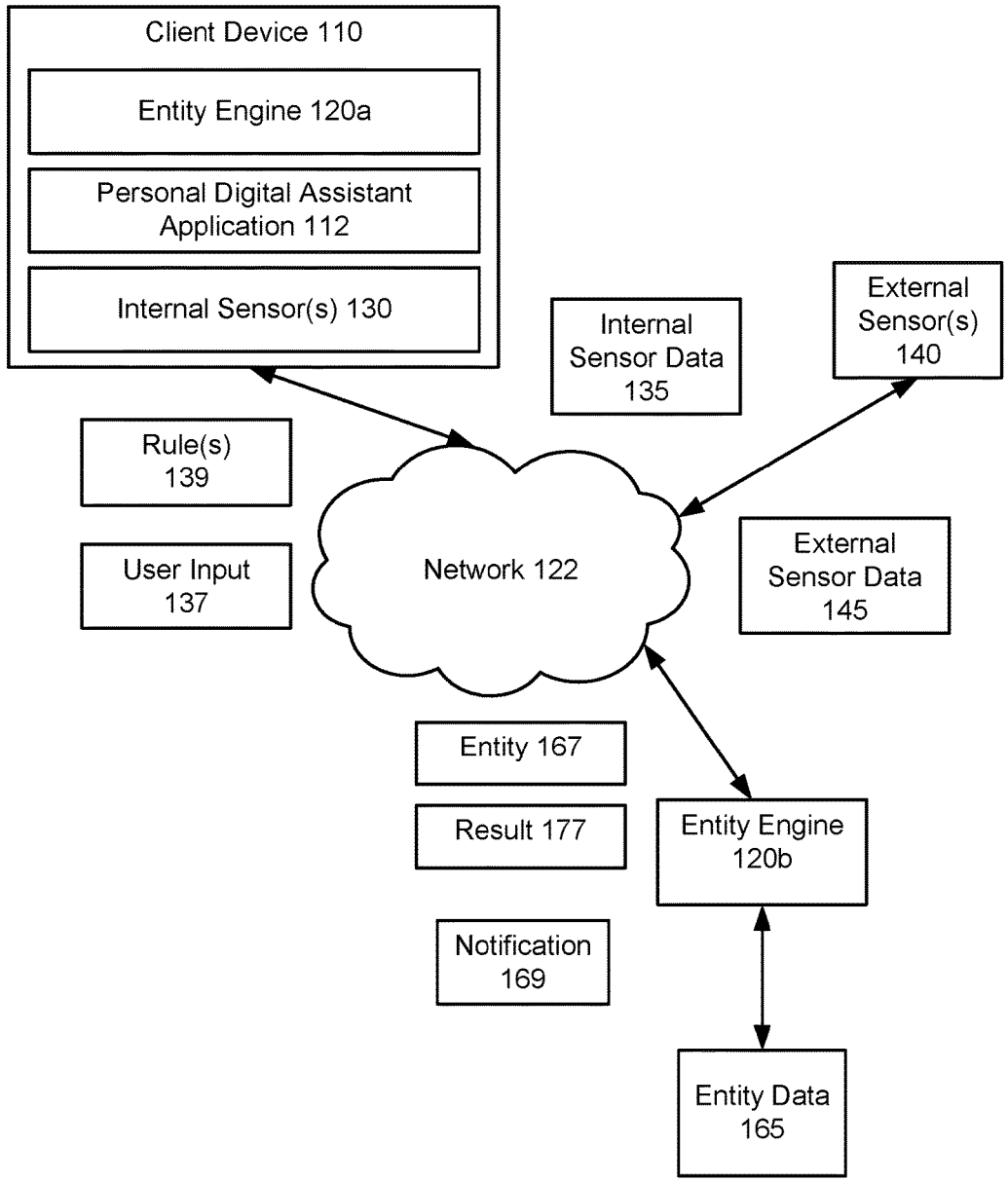
FIG. 1 is an illustration of an exemplary environment for identifying entities based on sensor data.

FIG. 1 is an illustration of an exemplary environment 100 for identifying entities based on sensor data. The environment 100 may include a client device 110, an entity engine 120a, and an entity engine 120b in communication through a network 122. The network 122 may be a variety of network types including the public switched telephone network (PSTN), a cellular telephone network, and a packet switched network (e.g., the Internet). Although only one client device 110, one entity engine 120a, and one entity engine 120b are shown in FIG. 1, there is no limit to the number of client devices 110, entity engines 120a, and entity engines 120b that may be supported.

Figure 12:
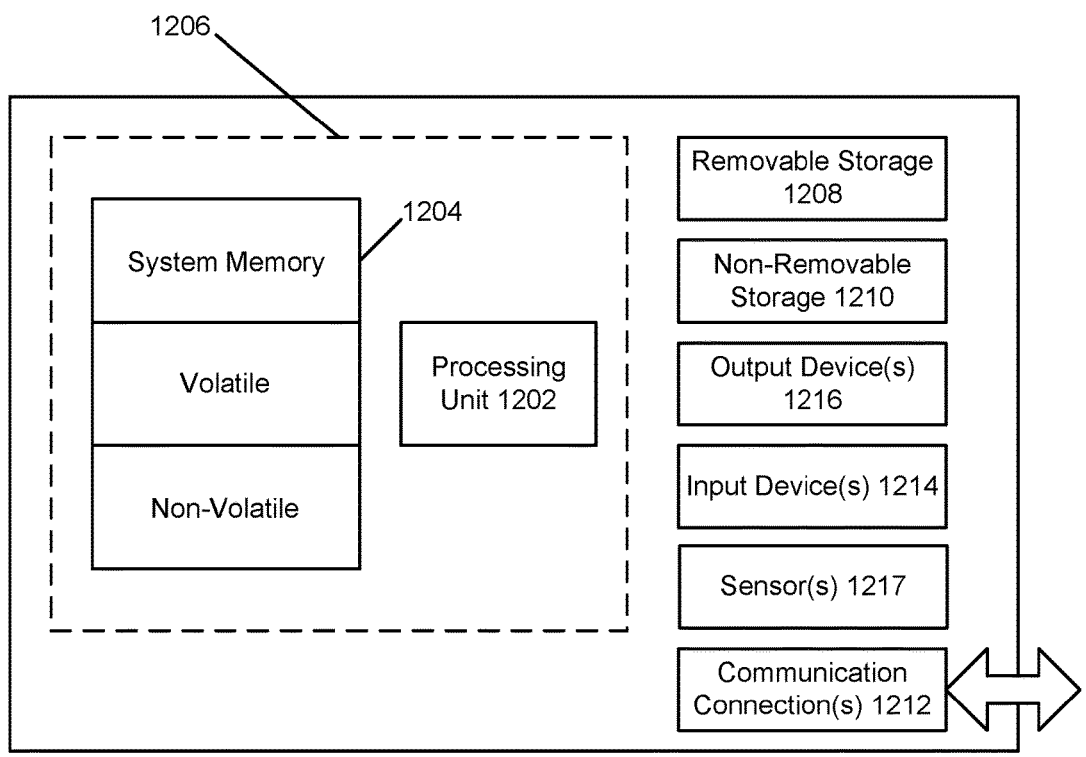
FIG. 12 shows an exemplary computing environment in which example embodiments and aspects may be implemented.

The client device 110, the entity engine 120a, and the entity engine 120b may be implemented together or separately using a general purpose computing device such as the computing device 1200 described with respect to FIG. 12. The client device 110 may be a smart phone, a tablet computer, an Internet-of-Things (IoT) device, a laptop computer, a set-top box, a personal/digital video recorder, video game console or any other type of computing device. Depending on the implementation, the client device 110 may have a display. The display may be a touchscreen or other type of screen.

The client device 110 may have one or more internal sensors 130 that each generate internal sensor data 135. The internal sensors 130 may be any sensor that is part of the client device 110. Examples of internal sensors 130 may include, but are not limited to, a video or image sensor (e.g., camera), a sound sensor (e.g., microphone), a location sensor (e.g., global positioning system (GPS)), an accelerometer, a barometer, a thermometer, an altimeter, and a hydrometer. The internal sensors 130 may also include operating system and application sensors (e.g., task managers, application APIs, etc.). Any type of sensor known in the art may be supported.

The client device 110, or a user associated with the client device 110, may also be associated with one or more external sensors 140 that each generate external sensor data 145. The external sensors 140 may be any sensor that is not part of the client device 110. Examples of external sensors 140 may include, but are not limited to, sensors associated with a security system (e.g., cameras and motion detectors), sensors associated with a fitness tracker (e.g., heart rate monitor, scale, pedometer, blood pressure monitor, blood oxygen level monitor), sensors associated with a smart watch, sensors associated with a video game console, sensors associated with a baby monitor, and sensors associated with an automobile. Any type of sensor known the art may be supported. For purposes of brevity, the internal sensor data 135 and external sensor data 145 may be referred to collectively as sensor data.

As may be appreciated, the particular sensor data generated for or by a client device 110 may be useful for a variety of applications. One such application is the identification of one or more entities 167. As used herein, an entity 167 may include any person, place, or thing whose presence may be inferred from the sensor data.

For example, where the sensor data is images or videos, the entities 167 may include the individuals, the objects, buildings, and locations that are visible or sensed e.g., GPS in the sensor data. Where the sensor data is sound, the entities 167 may include individuals or animals whose identity or type can be recognized by their voice or sounds. There could also be pressure, humidity, temperature, infrared (IR) sensors, etc. Other types of entities 167 may include virtual objects (e.g., songs), characters in books, computer generated glyphs, icons and related UI widgets (cursor, documents, files, windows, title bars, etc.).

In order to facilitate the identification of entities 167, the environment 100 may include the entity engine 120a and the entity engine 120b (collectively referred to herein as the entity engine 120). The entity engine 120a may reside in the client device 110, while the entity engine 120b may reside in one more servers that are external to the client device 110 (i.e., a cloud computing platform). While the entity engine 120 is illustrated as two components (i.e., 120a and 120b), it is for illustrative purposes only. For example, in some implementations, the entity engine 120 may be implemented using a single entity engine 120, while in other implementations there may be more than two entity engines 120.

In some implementations, the entity engine 120 may be integrated into a personal digital assistant application 112 associated with a user of the client device 110. A personal digital assistant application 112 may be an application of the client device 110 that receives one or more natural language queries from the user as part of a user input 137, and responds using stored information associated with the user, or using information retrieved from one or more external sources (i.e., the Internet). For example, a user may provide user input 137 by asking the personal digital assistant application 112 a query such as "What type of flower is this?" or "Where can I buy flowers like this?" The personal digital assistant application 112 may use a camera image and the user's current location to help respond to the query. Other types of queries of may be supported.

Figure 2:
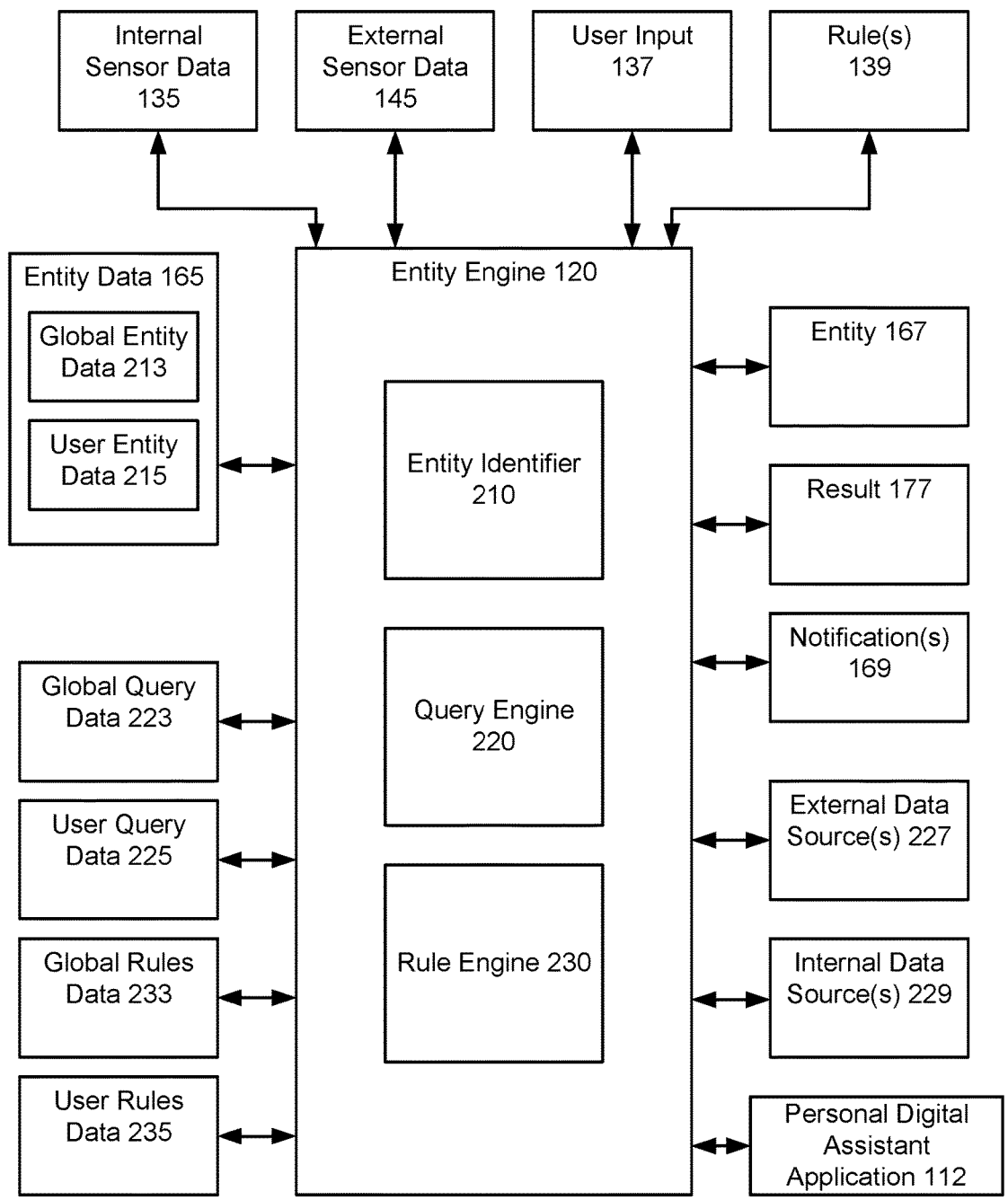
FIG. 2 is an illustration of an implementation of an entity engine.

As described further with respect to FIG. 2, the entity engine 120 may allow the personal digital assistant application 112 to identify entities 167 based on internal sensor data 135 and external sensor data 145. In some implementations, the entity engine 120 may receive the sensor data and may identify a plurality of entities 167 that are associated with the sensor data. For example, the entity engine 120 may apply one or more of audio, face, text, and object recognition algorithms to the sensor data to identify the entities 167.

In some implementations, after identifying the entities 167, the entity engine 120 may automatically identify one or more actions to perform with respect to some of all of the identified entities 167. The personal digital assistant application 112 may then display the identified one or more actions to the user. For example, when the identified entities 167 include a pizza, the personal digital assistant application 112 may ask the user if they would like to order a pizza, or if they would like to know how many calories are in the pizza. In another example, if the identified entities 167 include a tree, the personal digital assistant application 112 may ask the user if they would like to know what kind of tree it is.

After identifying the entities 167, the user of the client device 110 may provide the personal digital assistant application 112 with user input 137 that includes one or more queries with respect to the identified entities 167. The personal digital assistant application 112 may use the entity engine 120 to fulfill the query. The answer to the query may be provided by the entity engine 120 as a result 177. A variety of queries may be supported including select, project, join, union, and aggregation (SPJUA) queries. The SPJUA queries may allow the user to perform queries on the entities 167 including counting the entities 167 based on particular attributes or characteristics of the entities 167. Example SPJUA queries include "How many red cars do I see?" and "How many different kinds of flowers do I see?"

Depending on the implementation, the result 177 of a query may be determined based on the entities 167, and external data associated with the entity 167 such as data from a search engine or structured data source. Examples of these types of queries may include "What kind of car is that?", "How many calories are in that sandwich?", and "How many people are in this room?" Other types of queries may be supported.

In another example, the SPJUA queries may allow a user to generate queries using the structured data sources that are available to the entity engine 120. For example, a user may ask the query "What is the average salary of all baristas in the Seattle." Here the entity engine 120 could fulfill the query by joining structured data such as a table of barista salaries of all neighborhoods in Seattle and then performing a sum on the structured data.

In addition to receiving queries, in some implementations, the entity engine 120 may infer a query for the user based on the identified entities 167 and based on a web search or a search history of the user or other users. For example, where the entity 167 is a train, the entity engine 120 may use an Internet search history of the user (or other users) to determine what are the most frequently received search queries with respect to trains. The entity engine 120 may present one or more of the frequently received queries to the personal digital assistant application 112 to recommend to the user.

The entity engine 120, in addition to the queries, may present other information to the user and/or personal digital assistant application 112 about an entity 167. The information may similarly be determined by the entity engine 120 from the Internet or another data sources such as structured data. Depending on the implementation, the information may be presented as one more cards where each card includes information on the associated entity 167 such as facts about the entity 167 and queries or other actions that may be performed with respect to the entity 167. Example information about an entity 167 such as a person may include height, weight, age, address, etc. The information for a card may be static, or may be dynamically generated based on a web search or based on contacts or other information associated with the user.

The information presented (in a card other format) may depend on the specific identity of an entity 167. For example, where the entity 167 is a person whose birthday is today, the entity engine 120 may present the birthday to the personal digital assistant application 112 to display to the user. However, if the birthday of the entity 167 is not today, then the personal digital assistant application 112 may omit the birthday.

The entity engine 120 may log or record some or all of the identified entities 167 as entity data 165. The entries in the log for an entity 167 may include information such as when and where the entity 167 was identified. The entity data 165 may be used to fulfill one or more queries such as when a particular entity 167 was last identified, and how many times has a particular entity 167 been identified in a certain amount of time (e.g., the past three weeks), for example.

The entity engine 120 may allow a user of client device 110 to create one or more rules 139 using the personal digital assistant application 112. Each rule 139 may identify one or more entities 167 and may include one or more actions to perform. For example, a rule 139 may indicate that when a particular person is identified, a notification 169 may be generated and sent to the client device 110. At a later time, if the entity engine 120 identifies the particular person in either the internal sensor data 135 or the external sensor data 145, a notification 169 (such as an alert or an alarm) may be displayed on the display associated with the client device 110 (or whatever particular device the user is using at the time that the rule 139 is triggered).

The entity engine 120 may continuously collect sensor data and user input 137 from the user and may use the information to continuously learn and make inferences regarding the user and the entities 167 that the user interacts with. For example, over time, the entity engine 120 may recognize that when an entity 167 corresponding to particular person is identified, the user can be heard saying the name "Bob." The entity engine 120 may associate the entry in the entity data 165 for the particular person with the name "Bob." When the user later asks a question about Bob, the entity engine 120 will understand that the user is referring to the entity 167.

In another example, the entity engine 120 may log or record a time and location of some or all of the entities 167 that are identified. Other information such as a transcript (generated using speech-to-text recognition) of words spoken by the user when a particular entity 167 is identified may be recorded and associated with the log using a time stamp. At a later time, the transcripts can be mined for terms and phrases that are used when the entity 167 is present, and may be associated with the entity 167.

FIG. 2 is an illustration of an implementation of an entity engine 120. The entity engine 120 may include one or more components including an entity identifier 210, a query engine 220, and a rule engine 230. More or fewer components may be included in the entity engine 120. Some or all of the components of the entity engine 120 may be implemented by one or more computing devices such as the computing device 1200 described with respect to FIG. 12.

The entity engine 120 may identify one or more entities 167 based on either or both of the internal sensor data 135 and the external sensor data 145. As described above, the internal sensor data 135 may include, but are not limited to, data from sensors associated with a client device 110 of a user such as camera, microphone, accelerometer, etc. Similarly, the external sensor data 145 may include data from sensors that are associated with the user but may not be part of the client device 110 being used by the user. These sensors may include, but are not limited to, fitness trackers, sensors associated with videogame consoles, sensors associated with security systems, and sensors associated with televisions and other connected appliances (e.g., the Internet of Things).

In some implementations, the entity identifier 210 may continuously collect, receive, and/or record internal sensor data 135 and external sensor data 145 as a constant stream of sensor data. In other implementations, the sensor data may be received and/or collected in response to the user activating the personal digital assistant application 112 associated with the entity engine 120. For example, when the user activates the personal digital assistant application 112 by providing user input 137 such as speaking certain predetermined words, actuating a user interface element, or making a particular gesture, the entity engine 120 may begin receiving and processing sensor data. Other methods for activating the personal digital assistant application 112 may be used.

In some implementations, to protect the privacy of the user or other users, the entity identifier 210 may cease collecting or receiving sensor data under certain conditions. For example, the entity identifier 210 may maintain a list of businesses, establishments, or households that prohibit or discourage the collection of sensor data, and may cease receiving sensor data when it is determined that the client device 110 is at a location on the list. The entity engine 120 may also cease receiving sensor data 210 when the user, or any other individual near the user, expresses an indication that they do not consent to being part of the collected sensor data.

The entity identifier 210 may identify entities from the internal sensor data 135 and/or the external sensor data 145 using one or more application programming interfaces (API). The type of API used to identify entities 167 may depend on the particular format of the internal sensor data 135 and/or external sensor data 145 and the type of entities 167 that are being identified.

For example, where the sensor data is images or video, to identify entities 167 that are people, an API that is directed to identifying people or faces may be used. To identify entities that are books, an API that is directed to recognizing words or text may be used (i.e., OCR). To identify entities 167 that are objects, an API that is directed to recognizing objects may be used. Similarly, when the sensor data is sound, different APIs that are directed to identifying human voices or that are directed to identifying animals based on their calls may be used, for example.

In addition, different types of objects may have their own associated API. For example, objects such as food may be identified using an API that is directed to identifying different types of food, while objects such as trees may be identified using an API that is directed to identifying different types of trees.

When available, the entity identifier 210 may also consider any received user input 137 when identifying entities. Often, the user input 137 may include one or more words or phrases that are spoken by the user when they activate the personal digital assistant application 112 that may be helpful to narrow the types of entities 167 that the user is interested in, and/or select an appropriate API to perform the identification. For example, the user may provide the query "What kind of dog is that?" with the user input 137. Accordingly, when the entity identifier 210 identifies the entities 167, it may use an API directed to identifying dogs and different breeds of dogs.

In some implementations, the identified entities 167 may also include entities 167 that are related to other identified entities 167. For example, the sensor data 135 may include an entity 167 that is a particular pizza chain restaurant. The entity identifier 210 may identify the pizza, as well as the related pizza chain restaurant as entities 167, even though no restaurant of that particular pizza chain was in the sensor data.

Depending on the implementation, the entity identifier 210 may identify the entities 167 using the various APIs and one or more of global entity data 213 and user entity data 215 of the entity data 165. The global entity data 213 may be a library of known entities 167. Each entity 167 in the global entity data 213 may include descriptive information that may be used by the entity identifier 210, and one or more APIs, to identify the entities 167. The descriptive information may include information such as size, color, shape, etc. Where the sensor data includes sound, the descriptive information may include information such as pitch, tone, frequency, etc. Other information such as locations and times that have been known to be associated with an entity 167 may also be included in the descriptive information. Any type of descriptive information that may be used to identify entities 167 may be included in the global entity data 213.

Other information may be used to identify the entities 167 such as previously identified entities 167, and previously received sensor data. For example, an entity 167 that was previously identified in previously received sensor data may be more likely to be identified again in sensor data that an entity 167 that was not previously identified.

The user entity data 215 may be similar to the global entity data 213, but may be restricted to include descriptive information for those entities 167 that were previously identified for the user associated with the client device 110. As may be appreciated, a user is likely to encounter the same entities 167 repeatedly, and therefore the entity identifier 210 may be able to more quickly identify entities 167 in sensor data by first considering the entities 167 from the user entity data 215. The user entity data 215 may be thought of as a log or a personal library of the various entities 167 that have been encountered by a user across some or all of the client devices 110 associated with the user.

In addition, the user entity data 215 may include additional user-specific information. This additional information may include a time and a location when each entity 167 of the user entity data 215 was previously identified, or may include a time and a location where each entity 167 was most recently identified.

Depending on the implementation, such location and time information may be kept for some or all of the entities 167 identified in the user entity data 215, or only for those entities 167 selected by the user. For example, when viewing an image of their keys, the user may speak or input (e.g., type) instructions to the personal digital assistant application 112 of the client device 110 to "keep track of my keys." The personal digital assistant application 112 may instruct the entity identifier 120 to record the time and the location each time an entity 167 matches the description of the keys in the sensor data.

Other information such as sensor data and user input 137 may be used to continuously update the entities 167 in the user entity data 215. For example, internal sensor data 135 and/or external sensor data 145 related to the heart rate or blood pressure of the user can be recorded when a particular entity 167 is identified. For example, such information can be used to determine if an entity 167 was upsetting to the user, or if the user found the entity 167 relaxing.

In another example, the entity identifier 210 may correlate the words and phrases spoken by the user, or other users, from the sensor data and/or user input 137 when particular entities 167 are identified to learn what words and phrases may be associated with those entities 167. In this way, the entity identifier 210 may learn the various names and nicknames that the user may use to refer to the various entities 167 in their lives, such as friends, relatives, pets, etc. This information may be incorporated into the user entity data 215 by the entity identifier 210.

As may be appreciated, the information collected and stored in the user entity data 215 for a user may be personal and private. Accordingly, to protect the privacy of the user, all of the information stored in the user entity data 215 may be encrypted or otherwise only made available to the user using a client device 110 that is associated with the user. Moreover, before any information about the user is collected and stored in the user entity data 215, the user may be asked to opt-in or otherwise consent to the collecting and storing of such information.

After identifying the entities 167 in the internal sensor data 135 and/or the external sensor data 145, the entity identifier 210 may select one or more "entities of interest" from the identified entities 167. In some implementations, the entities of interest may be the subset of the identified entities 167 that the user is most likely to be interested in. As may be appreciated, a large number of entities 167 may be identified from the sensor data, and therefore presenting the user with information related to all of the identified entities 167 by the personal digital assistant application 112 may be overwhelming to the user.

In some implementations, entities of interest may be selected by scoring each of the identified entities 167, and selecting the entity 167 with the highest score. Alternatively, entities 167 with scores that are above a threshold score may be selected. The threshold may be selected by an administrator or based on user preferences, for example.

In some implementations, the scores for the entities 167 may be based on user query data 225 and/or global query data 223. The user query data 225 may include a history of queries that were received from the user by the personal digital assistant application. The user query data 225 may also include other types of queries associated with the user such as an Internet search history associated with the user.

For example, where an identified entity 167 is a car, and the user previously performed an Internet search for cars, then the car entity 167 may be scored higher than an entity 167 such as a tree that the user had not previously searched for.

The global query data 223 may include a history of queries that were received from many users of the personal digital assistant application. Similar to the user query data 225, the global query data 223 may include other types of queries such as an Internet search history of some or all of the users of the personal digital assistant application, or the search history of users that are not users of the personal digital assistant application.

By scoring entities 167 using global query data 223, a likely entity of interest may be identified even where the user has not previously encountered or queried the particular entity 167. In addition, scoring using the global query data 223 may allow the entity identifier 210 to anticipate what entities 167 that user may be interested in. For example, if an identified entity 167 is a particular celebrity that is trending on social media, then the score for that identified entity 167 may be increased because the user may be likely to show an interest in the entity 167 in the future.

Other information may be considered when scoring the entities 167 such as the position of the entities 167 or type of sensor data associated with the entities 167. For example, where the internal sensor data 135 is video, entities 167 that are in focus or closer to the user of the client device 110 may be scored higher than entities 167 that are farther from the user or otherwise out of focus. In addition, certain types of entities 167 may be favored over other types of entities 167. For example, identified entities 167 that are people (especially people known to the user) may be scored higher than inanimate objects or other types of entities 167.

How the entities 167 are scored may be further based on preferences set by the user or an administrator, depending on the implementation. The user may adjust the how the entities 167 are scored by adjusting their preferences using the personal digital assistant 112.

The entity identifier 210 may present the identified entities of interest to the personal digital assistant application along with one or more attributes of the entities 167. The attributes may be descriptive information about the identified entity 167. Depending on the implementation, the descriptive information may be taken from the global entity data 213 and/or the user entity data 215 associated with the identified entity 167. This information may include a name for the entity 167, and information such as the last time that the entity 167 was identified, etc.

The personal digital assistant application may receive the identified entities of interest, and may display indications of some or all of the entities of interest on the display of the client device 110. For example, where the internal sensor data 135 is a video, the personal digital assistant application 112 may highlight or draw a box around the entities of interest in the video. If the user selects one of the displayed entities of interest, the personal digital assistant application 112 may display the attribute information associated with the selected entity of interest.

The query engine 220 may determine one or more queries based on the user input 137, and may generate results 177 in response to the queries. Depending on the implementation, the user may provide the user input 137 by speaking the query into a microphone associated with the client device 110, or the user may type the query using a touch interface provided by the client device 110. Other methods for providing user input 137 may be used.

A determined query may be a gesture, a natural language query, or may be constructed using a query language or syntax that is supported by the entity engine 120. The queries may include SPJUA queries. For example, the user may construct queries such as "What is the total number of cars in front of the house?" or "How many apples have I seen this week?" Any methods or techniques for identifying and or processing queries may be used by the query engine 220.

The query engine 220 may fulfill a query based on some or all of the identified entities 167, or based on the displayed entities of interest. For example, the user may provide the query "How many trees do I see?" In response, the query engine 220 may count the number of identified entities 167 that are trees, and may present the number as the result 177.

The query engine 220 may fulfill a query using user entity data 215. For example, the user may provide the query "How many times did I see Steve Smith today?" In response, the query engine 220 may count the number of times the entity 167 "Steve Smith" appears in the user entity data 215 with a date that matches today's date, and may present the number as the result 177.

The query engine 220 may fulfill a query using one or more internal data sources 229 and one or more external data sources 227. The internal data sources 229 may include data such as contacts, calendar information associated with the user, or other information associated with the user or provided by the user. The external data sources 227 may include data from sources from the Internet such as online encyclopedias, as well as structured data sources such as product information.

For example, with respect to the external data sources 227, the user may provide a query such as "What is the total weight of all of the cars that I see?" To fulfill the query, the query engine 220 could count the number of identified entities 167 that are cars, and determine the average weight of a car from an external data source 227 such as an online encyclopedia. Alternatively, where the attributes of the identified entities 167 include the make and model of each car, the query engine 220 could fulfill the query using an external data source 227 such as structured data that indicates the actual weight of each make and model of car.

In some implementations, a determined query may be ambiguous, and before the query can be answered, the query engine 220 may first have to resolve the query. For example, a user may make an ambiguous query such as "Who is that?" Before the query engine 220 can generate a result 177 in response to the query, the query engine 220 may first determine what entity 167 the user means by "that."

Accordingly, to resolve a query, the query engine 220 may determine what is referred to as a context. The context for a query may be based on the attributes of the currently identified entities 167, and any recently received user input 137, for example. Any method for determining a query context may be used.

In some implementations, rather than wait for the user to submit a query to the personal digital assistant application, the query engine 220 may anticipate or infer a query that the user may be interested in based on the user query data 225 and/or the global query data 223, and the provided entity of interest.

For example, if the identified entity of interest is a piece of cake, the query engine 220 may determine based on the global query data 223 that the most popular query is "How many calories are in a piece of cake?" The query engine 220 may fulfill the inferred query, and may provide the determined number of calories to the personal digital assistant application 112 of the client device 110. The personal digital assistant 112 may display the calories proximate to the associated entity 167 on the display of the client device 110, or may ask the user "Do you want to know how many calories are in the piece of cake?"

The rule engine 230 may apply one or more rules 139 to the identified entities 167. Each rule 139 may be associated with one or more actions and one or more entities 167 whose presence (or absence) in the identified entities 167 will trigger the rule 139, and result in the performance of associated actions. An action may include any step(s) or process(es) that may be performed by a computer or group of computers. Example actions may include generating notifications 169, sounding one or more alarms, contacting authorities, turning on or off one or more appliances, making a purchase, transferring money, making an entry in a database, etc. The generated notifications 169 may include any type of electronic notification including, but not limited to, text messages, email messages, and voicemail messages.

In some implementations, the rules 139 may be created by the user associated with the client device 110. The user may speak a rule 139 into the microphone associated with the client device 110 or may type the rule 139 into the touch interface associated with the client device 110. The personal digital assistant application 112 may provide the rule 139 to the rule engine 230. Depending on the implementation, the rule engine 230 may store received rules 139 from the user in user rules data 235, and may apply the rules 139 from the user rules data 235 until otherwise instructed by the user.

For example, a user may speak the rule 139 "let me know when someone enters my house." The rule engine 230 may generate a notification 169 when the identified entities 167 from the sensor data include a person and have a location that indicates that the person has entered the user's house.

In another example, a user may speak the rule 139 "alert me when my daughter is near a knife (or a sharp object in general)." The rule engine 230 may generate a notification 169 whenever the identified entities 167 from the sensor data include both a knife and the user's daughter within some threshold distance.

In another example, a user may create a rule 139 that leverages social network contacts or other contacts associated with a user. For example, a user may create a rule 139 that sends messages to one or more of the users contacts when the system detects that the user may be about to eat more than a threshold amount of calories, or when the user is smoking or is about to smoke. Depending on the implementation, these rules 139 may be created automatically for a user when the user joins a group associated with weight loss or smoking cessation through a social network.

In some implementations, the rule engine 230 may also apply one or more rules 139 from global rules data 233. The global rules data 233 may include rules 169 that broadly apply to some or all of the users of the entity engine 120, and may have been created by an administrator. Examples of such rules 139 may be generating a notification 169 when the user's pulse exceeds some threshold, or generating a notification 169 when a security alarm associated with a user's residence has been activated. Other types of rules may be supported. Each of the rules 169 in the global rules data 233 may be activated or deactivated according to user preferences.

As may be appreciated, the entity engine 120 provides a framework for a variety of specialized applications. Each application may be implemented as a standalone "app" and may be made available to users for download from an application store. One such application is a personal reader. When a user desires to have a book, magazine, newspaper, or other textual material read to them, the user may capture an image or video of the textual material using the camera associated with the client device 110, and may speak or input a query or command such as "Read this to me."

The entity engine 120 may identify the textual material in the image (by detecting bar codes, detecting a title using OCR, etc.) and the entity engine 120 may provide text that the personal digital assistant application 112 can "read" to the user as a result 177. In some implementations, the text may be determined by locating an e-book or electronic version of the identified text, or by retrieving the text from a webpage or other external data source 227. Alternatively, the entity engine 120 may obtain the text directly from the video provided by the client device 110, and may periodically ask the user to "turn the page" so additional text can be retrieved. The entity engine 120 may identify the page number on a page to ensure that the user did not skip a page. Where the textual material is in a language other than the primary language spoken by the user, the entity engine 120 may translate the text using a variety of translation tools or APIs.

Continuing the example above, as the user reads the textual material, entities 167 may be identified in the textual material. The identified entities 167 may include characters, people, places, and objects described in the textual material or shown in pictures of the textual material. These identified entities 167 can be used by the entity engine 120 to answer queries for the user, or to trigger one or more rules as described above.

Another example application for the entity engine 120 is a health assistant. The entity engine 120 may identify entities 167 that are food, and may keep track of the food that is eaten by the user in the user entity data 215, or may provide nutritional information related to the identified food from the external data source 227. The identified food may be used to trigger rules 139 related to a number of calories consumed by the user. For example, the user may be alerted when they have exceeded their calorie goal for the day, or are within some threshold of their calorie goal for the day. As may be appreciated, the food related information may be correlated with external sensor data 145 received from a fitness tracker associated with a user to allow more complicated rules 139 based both on calories consumed and expended. The health assistant could similarly track the amount of water that is consumed by the user.

The health assistant application may cause the entity engine 120 to periodically collect sensor data that includes meals and to log the food that is identified in the user entity data 215. This historical meals data can be used by the health assistant to answer queries such as "How many calories did I eat last night", and "When was the last time I ate a hamburger?". The historical data may further include locations associated with each meal and/or identifiers of restaurants where each meal occurred to allow for queries such as "When was the last time I ate here?" and "What did I eat the last time I was in this restaurant?"

The health assistant may be able to track medications taken by the user to both ensure that the user is taking the correct dosage and to ensure that a doctor associated with the user is aware of the medications that the user is taking. For example, the entity engine 120 may identify entities 167 in sensor data that correspond to particular medications based on the size, colors, and other markings associated with medications. The entity engine 120 may keep track of which medications are taken by the user in the user entity data 215. Whether or not a particular medication was identified at a specified time may be used to trigger rules 139 that can remind the user to take the medication or can inform the doctor that the medication was taken. Any medication that is newly identified can be sent to the doctor to ensure that the doctor is aware of all of the medications that the user is taking.

Another example application for the entity engine 120 is a home assistant. In one scenario, the entity engine 120 may determine that lights are on in rooms that are unoccupied, and may take one or more actions based on the determination. For example, based on external sensor data 145 such as a security camera or a camera associated with a videogame console, the entity engine 120 may identify entities 167 that are lights that are on in rooms where no entities 167 that are people are also identified. The presence of on lights and no people may trigger rules 139 that cause a notification 169 to be provided to the user. Where the entity engine 120 is integrated into a home automation system, an instruction to turn off the light may be provided. Similar functionality can be used to track how long family members watch television, to determine that a faucet is leaking or running unattended, or to determine that a window or door has been left open, for example.

In another scenario for the home assistant, the entity engine 120 may track the contents of a refrigerator. As food entities 167 are added and removed from the refrigerator, they are captured by a sensor, and identified by the entity engine 120. The entity engine 120 may keep track of the food entities 167 in the user entity data 215 along with information such as expiration dates. The user may receive notifications 169 to replenish certain food entities 167 as they are consumed and/or expire. Similar functionality can be used to track cleaning supplies or other good that can be depleted.

Figure 3:
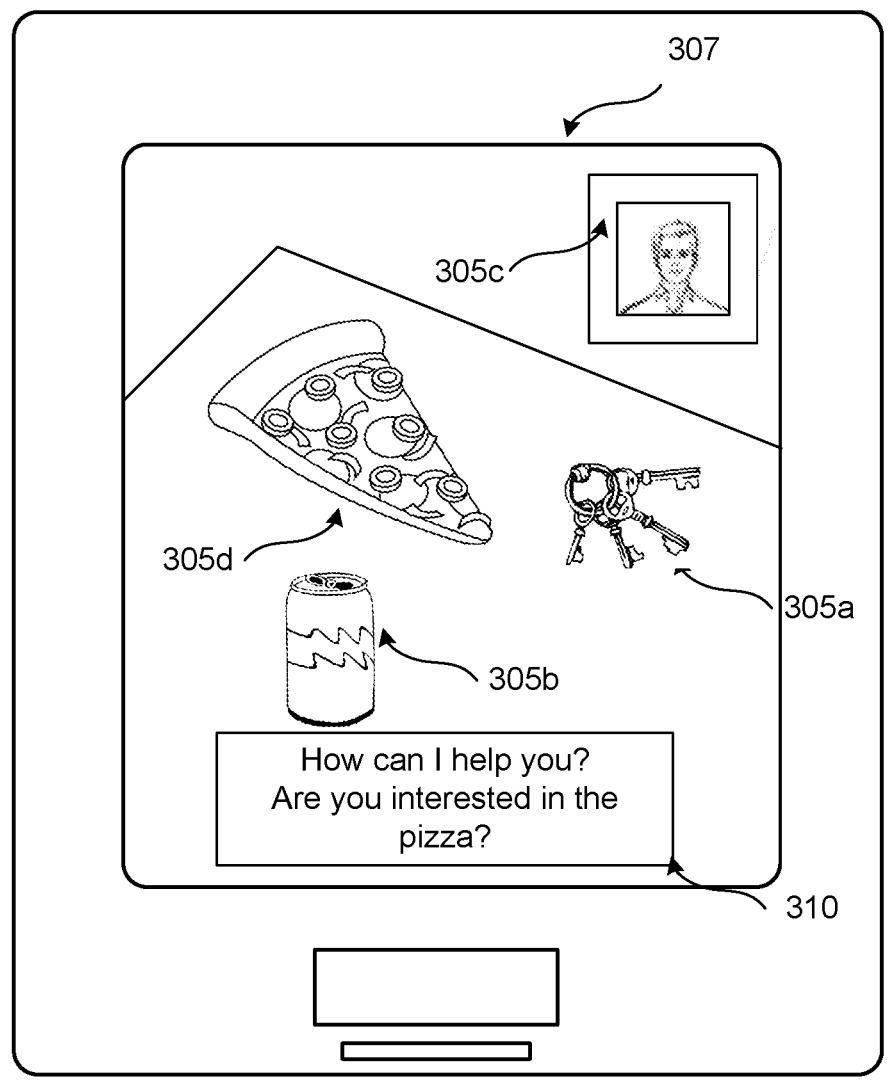
FIGS. 3-8 are illustrations of example client devices utilizing an entity engine.

FIG. 3 is an illustration of an example client device 300. In the example, the client device 300 is a smart phone or a tablet computer that includes a touch screen 307. While not shown, the client device 300 also includes a rear-facing camera that is generating internal sensor data 135 that includes the video content that is displayed on the touch screen 307. The client device 300 may be implemented by one or more computing devices such as the computing device 1200 described with respect to FIG. 12.

In the example shown, the user has activated the personal digital assistant application executing on the client device 300, and in response to the activation, the entity identifier 210 has identified several entities 167 in the video data. The identified entities 167 include a set of keys 305a, a can of soda 305b, a person 305c, and a slice of pizza 305d. Depending on the implementation, the entity identifier 210 may have logged some or all of the identified entities 167 in the user data 215.

As shown in a user-interface element 310, the personal digital assistant application may have prompted the user to provide a query by asking "How can I help you?" In addition, the entity identifier 210 may have identified the slice of pizza 305d as the entity of interest as indicated by the prompt "Are you interested in the pizza?"

Figure 4:
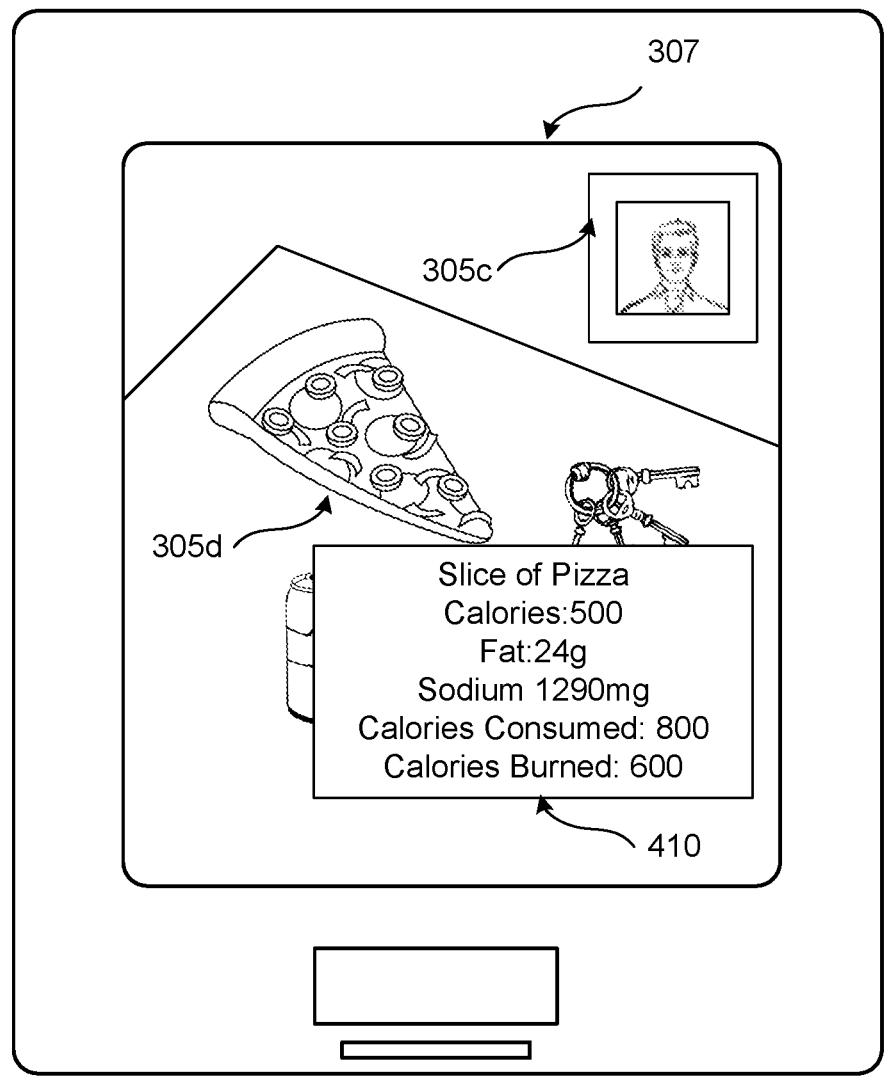

Continuing to FIG. 4, the user has spoken "Yes", which is interpreted by the personal digital assistant application as the user indicating that they are interested in the slice of pizza 305d. Accordingly, the personal digital assistant application has displayed a user interface element 410 that includes attributes associated with the slice of pizza 305d. The attributes may have been selected by the query engine 220 from the external data sources 227 and internal data sources 229, for example.

Figure 5:
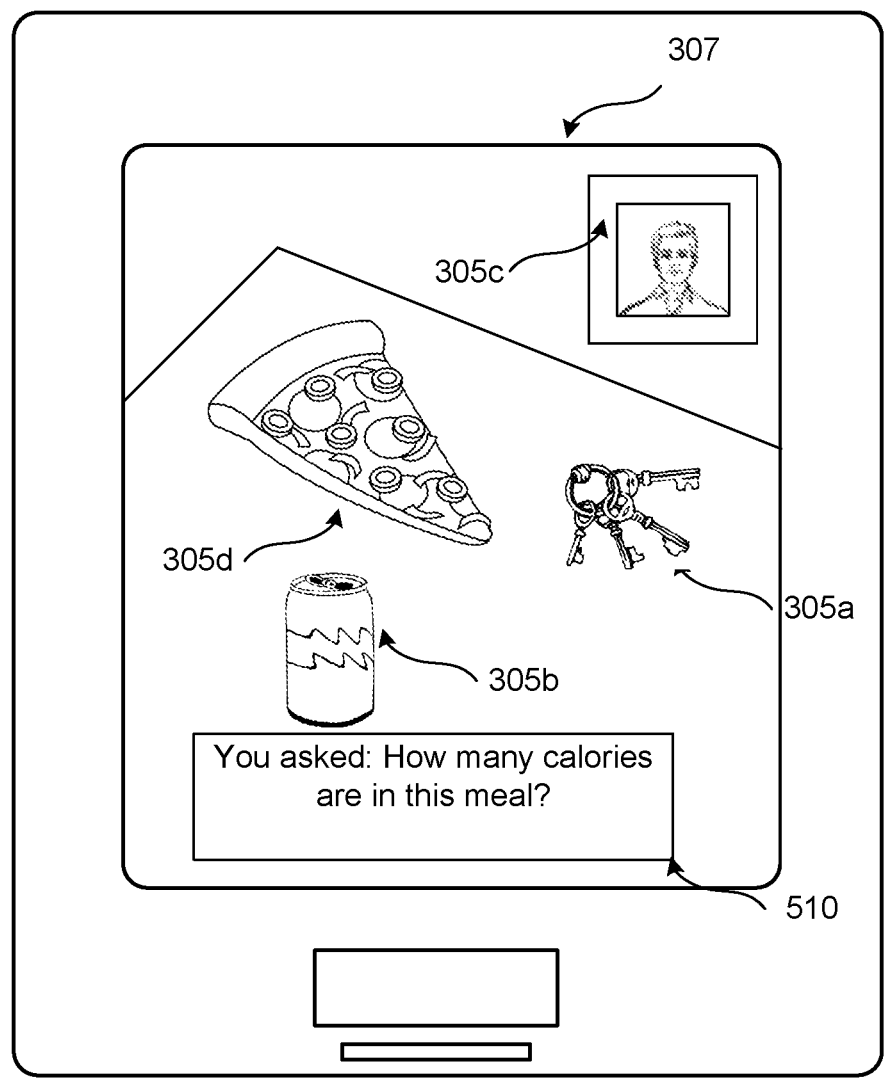

Continuing to FIG. 5, the user continues to interact with the personal digital assistant application and has provided the query of "How many calories are in this meal?" as indicated in the user-interface element 510. To fulfill the query, the query engine 220 may resolve the query. For example, the query engine 220 may determine that the term "meal" refers to food, and that in the context that includes the identified entities 167 there are two entities 167 that are food (i.e., the can of soda 305b and the slice of pizza 305d).

After resolving the query, the query engine 220 fulfills the query from one or both of the internal data sources 229 and the external data sources 227. For example, the query engine 220 may determine the calories in the slice of pizza 305d and the can of soda 305b from a structured database that has nutritional information for a variety of foods. If the query engine 220 cannot exactly match the slice of pizza 305d with a "known" slice of pizza, or has multiple matches, additional information may be considered, such as a location that indicates a restaurant where the user is located. The location may be used to identify a database with nutritional information that is specific to the restaurant. Alternatively, the caloric information may be retrieved from a website associated with the restaurant.

Figure 6:
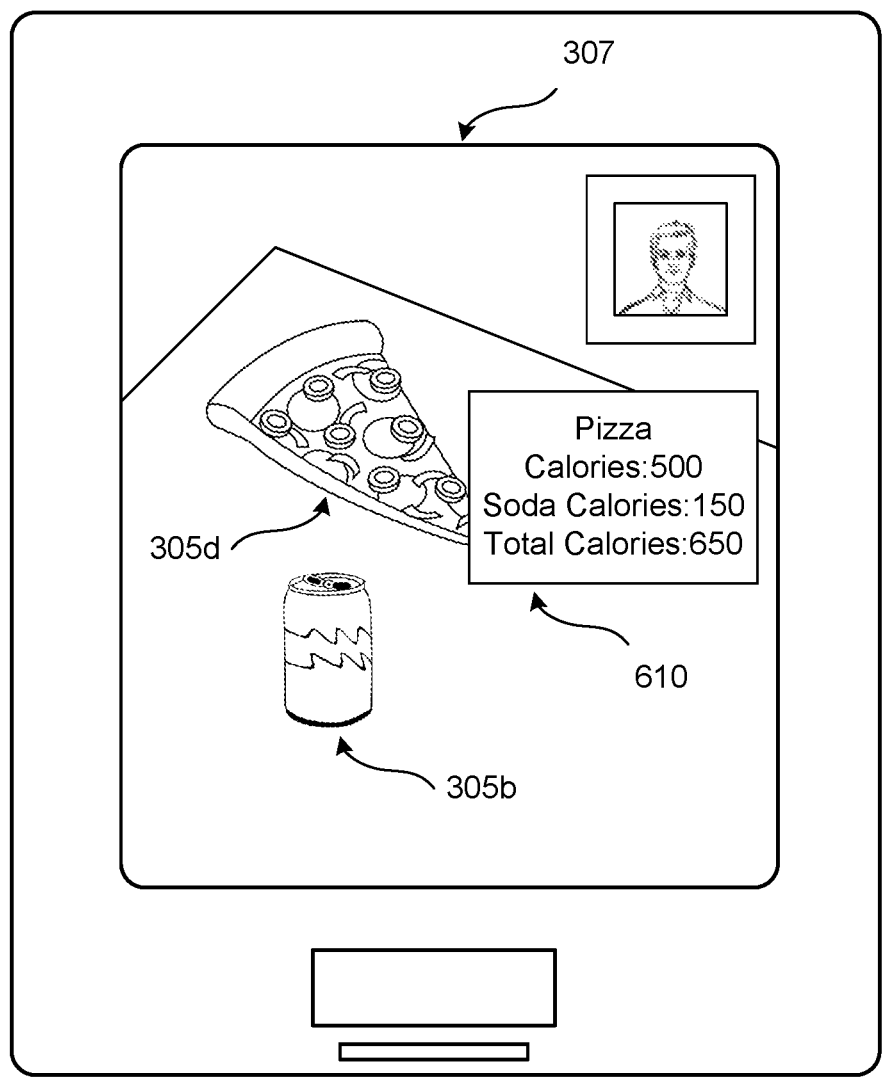

Continuing to FIG. 6, the query engine 220 has provided the result 177 of the query to the personal digital assistant application of the client device 300. The personal digital assistant has displayed the result 177 to the user on the touch display 307 in a user-interface element 610.

Figure 7:
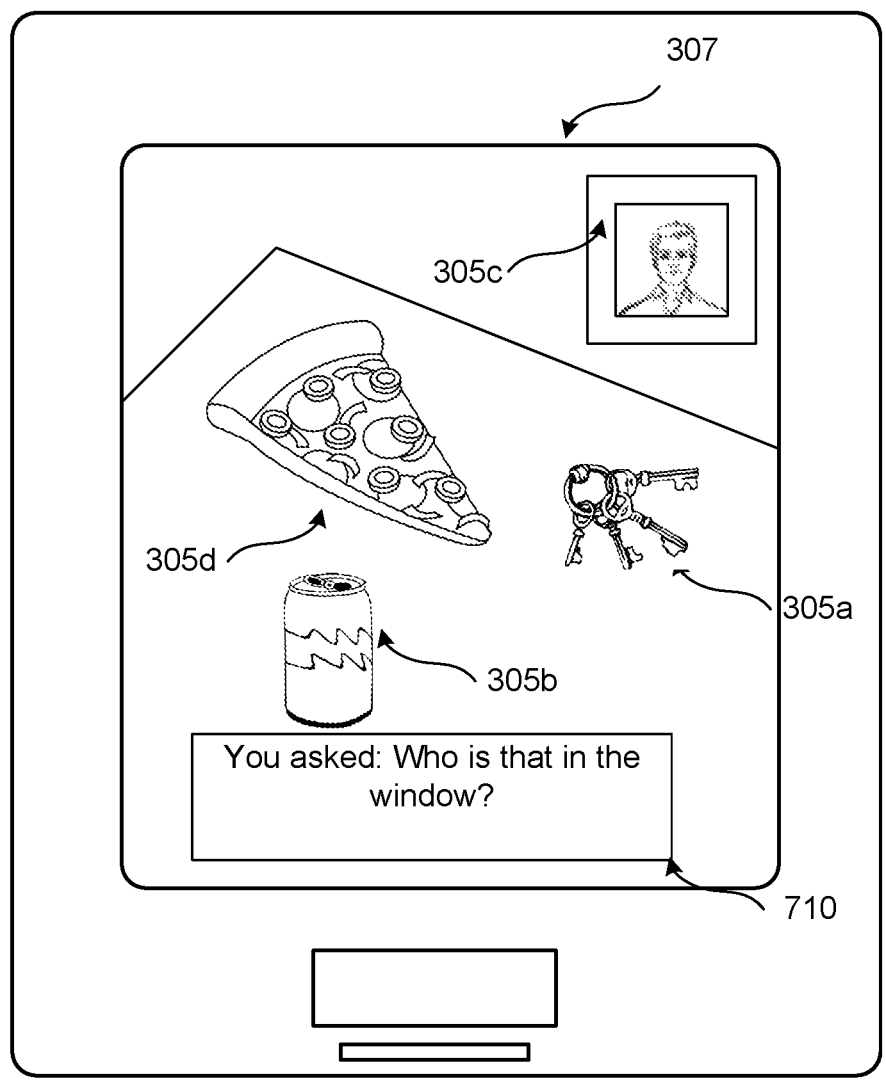

Continuing to FIG. 7, the user continues to interact with the personal digital assistant application and has provided the query of "Who is that in the window?" as indicated in the user-interface element 710. In order to fulfill the query, the query engine 220 may determine that the term "who" and "window" refer to the person 305c.

After resolving the query, the query engine 220 fulfills the query from one or both of the internal data sources 229 and the external data sources 227. For example, the query engine 220 may determine using facial recognition that the person 305c matches an image of a particular contact of the user, or matches a profile image in a social networking application that is associated with by the user. Other methods or techniques may be used.

Figure 8:
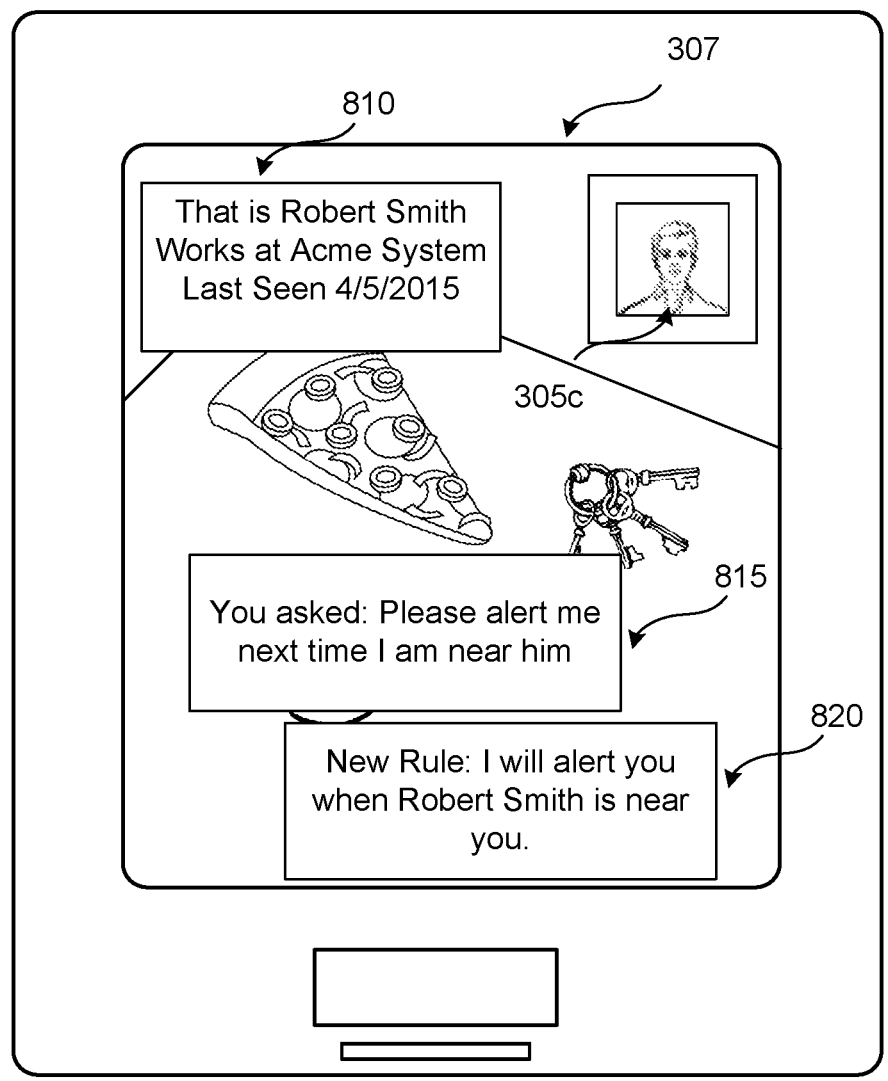

Continuing to FIG. 8, the query engine 220 has provided the result 177 of the query to the personal digital assistant application of the client device 300. The personal digital assistant application displayed the results to the user on the touch display 307 in a user-interface element 810 that identifies the person 305c as "Robert Smith." In addition, other information is displayed such as the last time the person 305c was identified as indicated by the user entity data 215. The other information may include "status information" that the person 305c has defined for themselves. For example, the person 305c may have specified text such a job title and recent projects that are to be displayed when they are encountered or recognized by an entity engine 120.

Other information such as whether or not the person 305c has been authenticated by their associated device may also be displayed.

As shown in a user-interface element 815, the user has provided the rule 139 of "Please alert me the next time I am near him" to the personal digital assistant application of the client device 300. Based on context information such as the previously submitted query related to the person 305c, the rule engine 230 may resolve "him" as referring to the person 305c. The rule engine 230 may add a rule 139 to the user rules data 235 that is triggered whenever the identified entities 167 include the person 305c within a threshold distance of the user of the client device 300. To notify the user that the rule has been created, the personal digital assistant application has displayed a confirmation message of "I will alert you when Robert Smith is near you" in a user-interface element 820.

Figure 9:
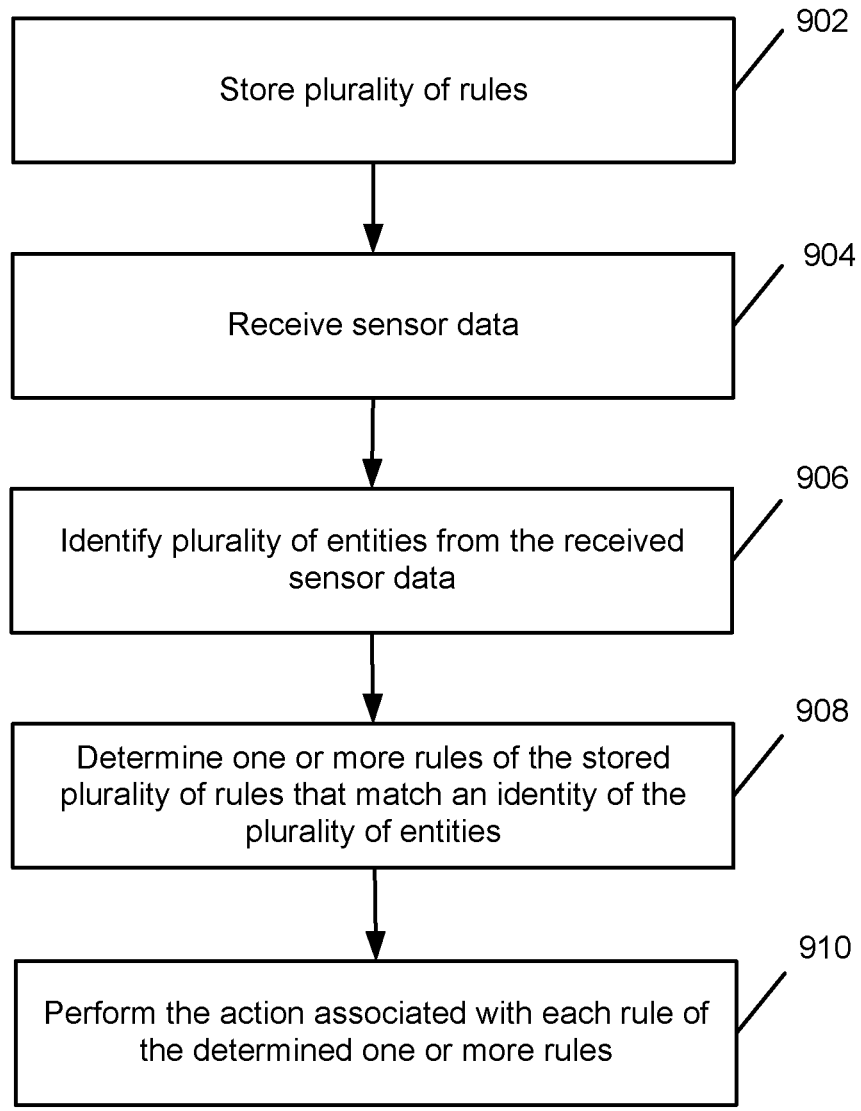
FIG. 9 is an operational flow of an implementation of a method for performing actions associated with one or more rules based on entities identified in sensor data.

FIG. 9 is an operational flow of an implementation of a method 900 for performing actions associated with one or more rules based on entities identified in sensor data. The method 900 may be implemented by the entity engine 120.

At 902, a plurality of rules is stored. The plurality of rules 139 may be stored by the rule engine 230 of the entity engine 120 as the user rules data 235. Depending on the implementation, the rules 139 may have been created by a user associated with a client device 110 using a personal digital assistant application. The client device 110 may be a smart phone, tablet computer, laptop, desktop, video game console, or any other type of computing device.

At 904, sensor data is received. The sensor data may be received by the entity identifier 210 from the client device 110 associated with the user, or one or more other client devices 110. The sensor data may include internal sensor data 135 and external sensor data 145. The internal sensor data 135 may be sensor data that is received from one or more internal sensors 130 that are part of the client device 110, such as cameras, microphones, accelerometers, etc. The external sensor data 145 may be sensor data that is received from one or more external sensors 140 that are associated with client devices that are different from the client device 110, such as video game consoles, fitness trackers, security systems, etc.

At 906, a plurality of entities is identified from the received sensor data. The plurality of entities 167 may be identified by the entity identifier 210 of the entity engine 120. The identified entities 167 may include people, objects, and locations that can be identified from the sensor data. Depending on the implementation, the entity identifier 210 may identify the entities 167 using one or more APIs directed to identifying different types of entities 167 (e.g., facial recognition, object recognition, OCR, etc.).

At 908, one or more rules that match an entity of the plurality of entities is determined. The one or more matching rules 139 may be determined by the rule engine 230 of the entity engine 120. Each rule 139 may be associated with one or more entities 167, or attributes of the entities 167, whose presence (or absence) in the identified entities 167 may trigger the rule 139. Each rule 139 may further utilize other information such historical information, time information, and location information. Example rules may include "alert me when someone is wearing a green sweater when it is not St. Patrick's day" and "alert me when John is wearing a different color pair of pants than the color he wore yesterday." In some implementations, the rule engine 230 may determine whether or not a rule 139 matches the identified entities 167 by comparing the entities 167 associated with the rule 139 and the identified entities 167.

At 910, the action associated with at least one of the determined one or more rules is performed. The action may be performed by the rule engine 230 of the entity engine 120. Each rule 139 may be associated with one or more actions that are performed when the particular rule 139 is matched by the rule engine 230. Example actions may include sending one or more notifications 169, sounding an alarm, or generating an electronic message or instruction. New rules 139 and/or actions may be added to the rules engine 230 by developers.

Figure 10:
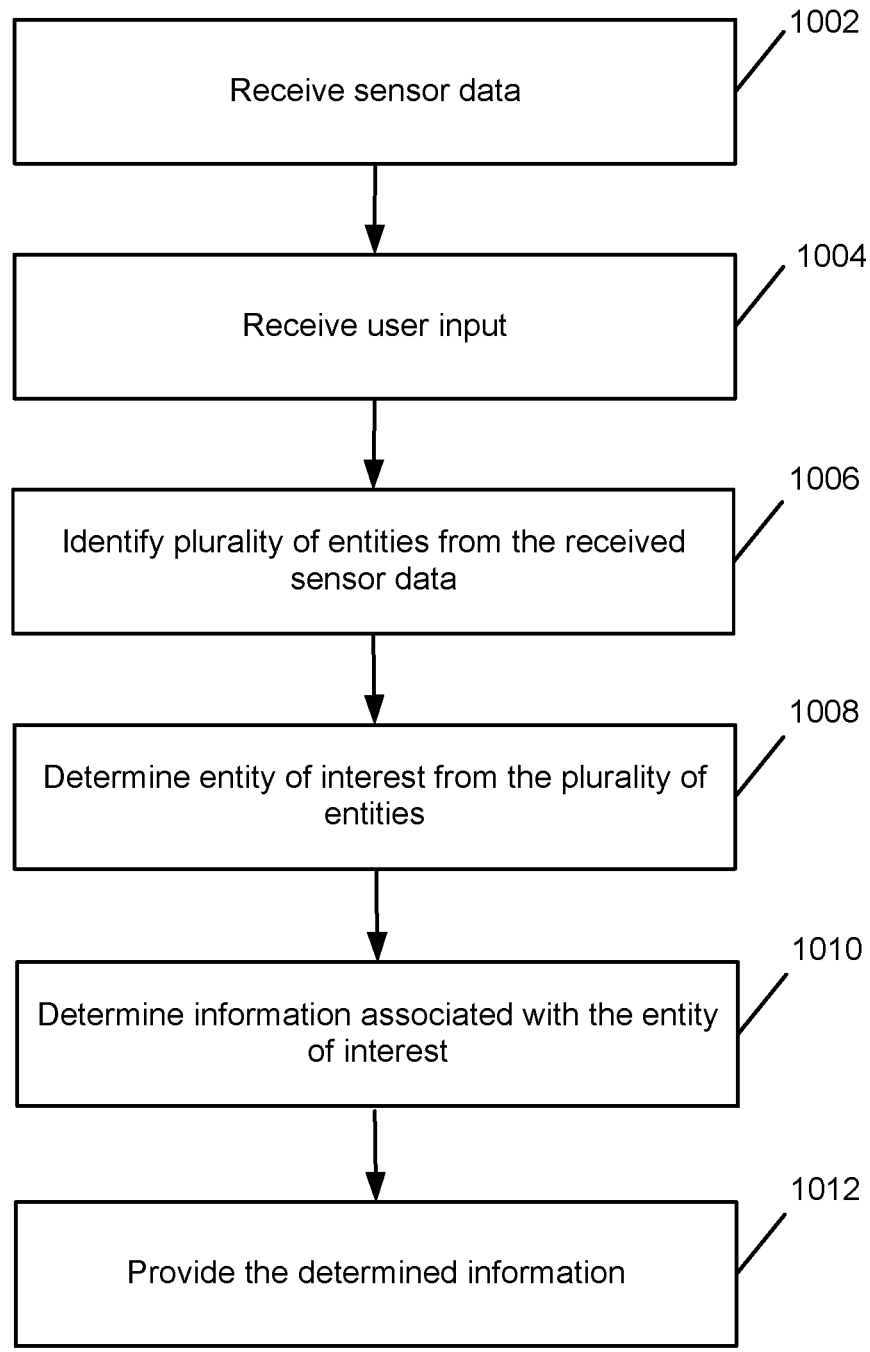
FIG. 10 is an operational flow of an implementation of a method for providing information for entities identified in sensor data.

FIG. 10 is an operational flow of an implementation of a method 1000 for providing information for entities identified in sensor data. The method 1000 may be implemented by the entity engine 120.

At 1002, sensor data is received. The sensor data may be received by the entity identifier 210 from a client device 110 associated with a user, or one or more other client devices 110. The sensor data may include internal sensor data 135 and external sensor data 145.

At 1004, user input is received. The user input 137 may be received by the entity identifier 210 of the entity engine 120. The user input 137 may include spoken commands or phrases from a user of the client device 110, and/or may include text or gestures made by the user on a touch interface associated with the client device 110. In some implementations, the user input 137 may include a query.

At 1006, a plurality of entities is identified from the received sensor data. The entity identifier 210 may identify the entities 167 using the user input 137 and one or more APIs directed to identifying different types of entities 167.

At 1008, an entity of interest from the plurality of entities is determined. The entity of interest may be determined by the entity identifier 210 from the identified entities 167 based on the user input 137. For example, where the user input 137 indicated that the user wanted to know what the name of the person in a video portion of the sensor data is, the entity identifier 210 may determine an identified entity 167 that is a person as the entity of interest.

In addition, optionally, the entity identifier 210 may compute a score for each identified entity 167 based on the user input and/or Internet search history data from the global query data 223. The Internet search history data may include the types and names of entities 167 that are popular and being searched for, and therefore may help determine which entity of the identified entities 167 the user may be interested in.

At 1010, information associated with the determined entity of interest is determined. The information associated with the determined entity of interest may be attributes of the entity of interest and may be determined by the entity identifier 210 of the entity engine 120. Depending to the implementation, the attributes may be determined using one or more internal data sources 229 or external data sources 227.

At 1012, the determined information is provided. The determined information may be provided by the entity identifier 210 of the entity engine 120 to the personal digital assistant application executing on the client device 110.

Figure 11:
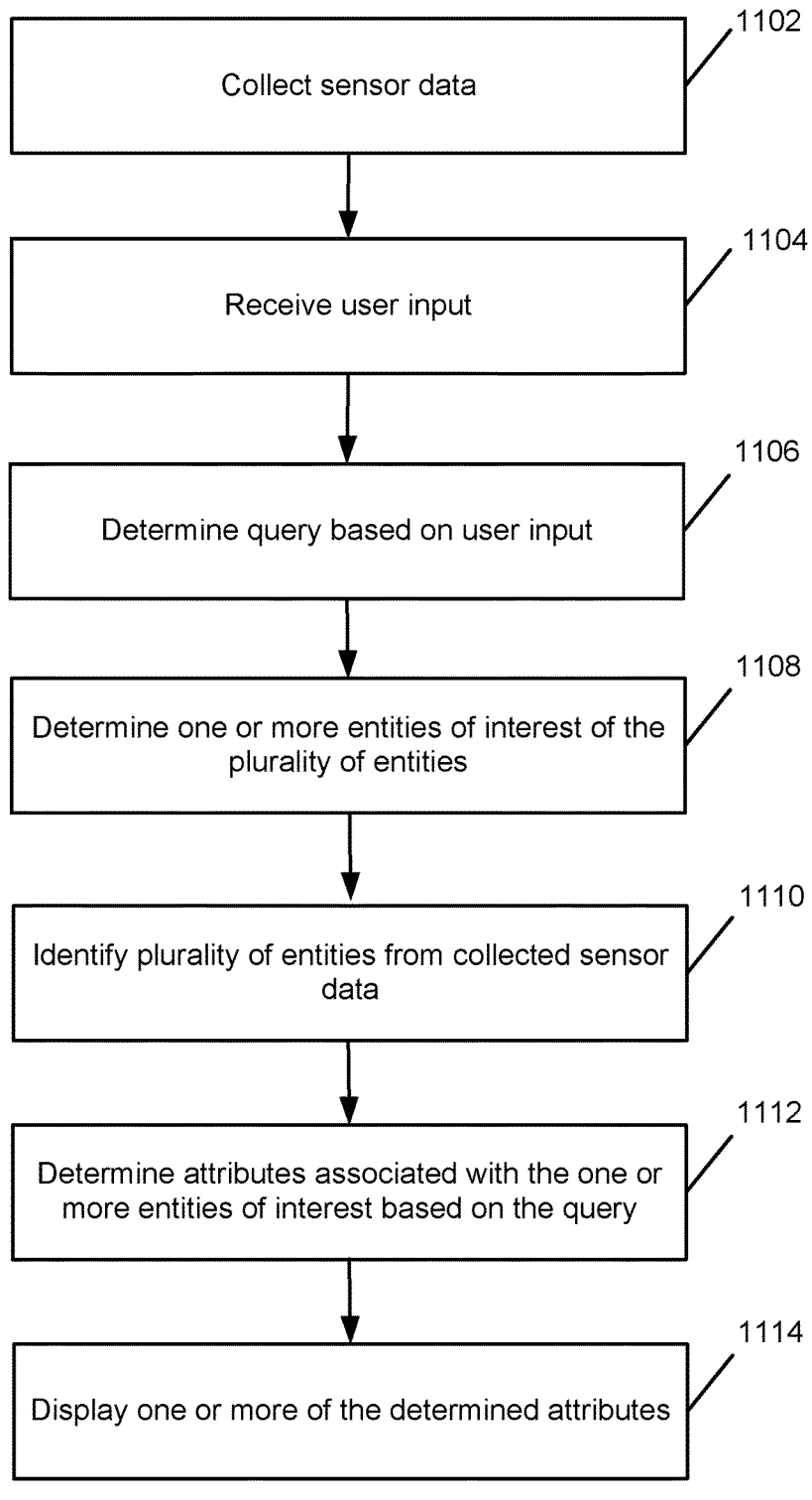
FIG. 11 is an operational flow of an implementation of a method for determining attributes associated with one or more entities identified in sensor data based on a query.

FIG. 11 is an operational flow of an implementation of a method 1100 for determining attributes associated with one or more entities identified in sensor data based on a query. The method 1100 may be implemented by the entity engine 120.

At 1102, sensor data is collected. The sensor data may be collected by the client device 110 associated with a user, or one or more other client devices 110. Depending on the implementation, the sensor data may be collected in response to the user activating a personal digital assistant application executing on the client device 110.

At 1104, user input is received. The user input 137 may be received by the entity identifier 210 of the entity engine 120. The user input 137 may include spoken commands or phrases from the user of the client device 110, and/or may include text or gestures made by the user on a touch interface associated with the client device 110.

At 1106, a query is determined based on the user input. The query may be determined by the query engine 220 of the entity engine 120. In some implementations, the query may be identified by the query engine 120 by parsing the user input 137 using natural language processing or other processing to determine that the query that was provided by the user as part of the user input 137.

At 1108, a plurality of entities is identified from the collected sensor data. The entity identifier 210 may identify the entities 167 using the user input 137 and one or more APIs directed to identifying different types of entities 167.

At 1110, one or more entities of interest of the plurality of entities is determined. The one or more entities of interest may be determined by the entity identifier 210 from the identified entities 167 based on the user input 137 and/or the determined query.

Alternatively, where no query is explicitly included in the user input 137, the query engine 220 may infer or guess the query that the user may ask. Depending on the implementation, the query engine 220 may infer the query based on the received user input, the determined one or more entities of interest, and search history data such as the global query data 223.

At 1112, attributes associated with the one or more entities of interest are determined. The attributes may be determined by the query engine 220 by fulfilling the determined query using one or more of the external data sources 227 and the internal data sources 229.

At 1114, one or more of the determined attributes are displayed. The one or more of the determined attributes may be displayed by the personal digital assistant application on a display associated with the client device 110.

FIG. 12 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 12, an exemplary system for implementing aspects described herein includes a computing device, such as computing device 1200. In its most basic configuration, computing device 1200 typically includes at least one processing unit 1202 and memory 1204. Depending on the exact configuration and type of computing device, memory 1204 may be volatile (such as random access memory (RAM)), non-volatile (such as read-only memory (ROM), flash memory, etc.), or some combination of the two. This most basic configuration is illustrated in FIG. 12 by dashed line 1206.

Computing device 1200 may have additional features/functionality. For example, computing device 1200 may include additional storage (removable and/or non-removable) including, but not limited to, magnetic or optical disks or tape. Such additional storage is illustrated in FIG. 12 by removable storage 1208 and non-removable storage 1210.

Computing device 1200 typically includes a variety of computer readable media. Computer readable media can be any available media that can be accessed by the device 1200 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1204, removable storage 1208, and non-removable storage 1210 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media may be part of computing device 1200.

Computing device 1200 may contain communication connection(s) 1212 that allow the device to communicate with other devices. Computing device 1200 may also have input device(s) 1214 such as a keyboard, mouse, pen, voice input device, touchscreen, etc. Output device(s) 1216 such as a display, speakers, printer, etc. may also be included. Computing device 1200 may also receive data from one or more sensor(s) 1217. The sensor(s) 1217 may include one or more of cameras, microphones, accelerometers, global positioning systems (GPSs), proximity sensors, gyroscopes, etc. All these devices and sensors are well known in the art and need not be discussed at length here. Additionally, or alternatively, the sensor(s) 1217 may include sensors such as those described above as the internal sensor(s) 130 and/or the external sensor(s) 140.

It should be understood that the various techniques described herein may be implemented in connection with hardware components or software components or, where appropriate, with a combination of both. Illustrative types of hardware components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for automatically identifying entities based on sensor data and for performing one or more actions based on the identified entities is provided. The system includes at least one computer and an entity engine. The entity engine is adapted to store a plurality of rules. Each rule is associated with an entity and an action. The entity engine is further adapted to: receive sensor data from a plurality of sensors; identify a plurality of entities from the sensor data; determine one or more rules of the plurality of rules that match an entity of the plurality of entities; and perform the action associated with at least one of the determined one or more rules.

Implementations may include some or all of the following features. The plurality of sensors may include a plurality of internal sensors and a plurality of external sensors. The plurality of external sensors may be associated with one or more of a camera, a fitness tracker, a security system, or a video game console, and the plurality of internal sensors may include one or more of a microphone, an accelerometer, a camera, a proximity sensor, a pedometer, or a global positioning system (GPS). The entity engine may be further adapted to store indicators of one or more of the entities of the plurality of identified entities in a log associated with a user of the at least one computer. Each indicator may be associated with a time when the indicated entity was identified and a location where the indicated entity was identified. The entity engine may be further adapted to receive one or more of the plurality of rules. The entity engine may be further adapted to: determine an entity of interest of the plurality of entities; determine attributes associated with the entity of interest; and display one or more of the determined attributes on a device. The entity engine adapted to identify the plurality of entities from the sensor data may include the entity engine adapted to identify the plurality of entities from the sensor data using the sensor data, one or more previously identified entities and previously received sensor data. The entity engine may be implemented on one or both of the at least one computing device or a cloud computing platform.

In an implementation, a system for automatically identifying entities based on sensor data and for providing attributes based on the identified entities is provided. The system includes at least one computer and an entity engine. The entity engine is adapted to: receive sensor data from a plurality of sensors of a device; identify a plurality of entities from the sensor data; determine an entity of interest of the plurality of entities; determine attributes associated with the entity of interest; and display one or more of the determined attributes on the device.

Implementations may include some or all of the following features. The entity engine may be further adapted to: receive user input associated with a user of the device; and determine the entity of interest of the plurality of entities based on the user input. The entity engine may be further adapted to: store a plurality of rules, wherein each rule is associated with an entity and an action; determine one or more rules of the plurality of rules that match an entity of the plurality of entities; and perform the action associated with at least one of the determined one or more rules. The action may include one or more of generating an alarm, generating a notification, performing an internet search, performing a text-to-speech translation, finding a location, and performing a financial transaction. The device may include one or more of a smart phone, a laptop, desktop, or a tablet computer, and the plurality of sensors comprise one or more of a microphone, an accelerometer, a camera, a proximity sensor, a pedometer, and a global positioning system (GPS).

In an implementation, a method for automatically identifying entities based on sensor data and for determining attributes associated with the identified entities is provided. The method includes collecting sensor data from one or more sensors of a plurality of sensors associated with a device by the device; identifying a plurality of entities from the sensor data by the device; receiving user input by the device; determining one or more entities of interest from the plurality of entities based on the received user input by the device; determining a query based on the received user input by the device; determining attributes associated with the one or more entities of interest based on the query by the device; and displaying one or more attributes of the determined attributes on a display associated with the device by the device.

Implementations may include some or all of the following features. The method may further include storing indicators of one or more of the entities of the plurality of identified entities in a log associated with a user of the at least one computer. Each indicator may be associated with a time when the indicated entity was identified and a location where the indicated entity was identified. Identifying the plurality of entities from the sensor data may include identifying the plurality of entities from the sensor data using the sensor data, one or more previously identified entities, and previously received sensor data. The method may further include determining one or more rules of a plurality of rules that match an entity of the plurality of entities; and performing an action associated with each rule that is determined to match an entity of the plurality of entities. The query may be a select, project, join, union, and aggregation (SPJUA) query.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for automatically identifying entities based on sensor data and for performing one or more actions based on the identified entities, the system comprising:
   at least one computer; and
   an entity engine adapted to:
     store a plurality of rules, wherein each rule is associated with an entity and an action;
     receive sensor data from a plurality of sensors;

identify a plurality of entities from the sensor data;
determine one or more rules of the plurality of rules that match an entity of the plurality of entities;
perform the action associated with at least one of the determined one or more rules;
determine an entity of interest of the plurality of entities by scoring each of the plurality of entities and selecting the entity with the highest score as the entity of interest, wherein the scoring is based on at least one of user query data or global query data, wherein the user query data includes a history of queries associated with a user of the at least one computer, and wherein the global query data includes a history of queries associated with a plurality of users other than the user;
determine attributes associated with the entity of interest, wherein the attributes comprise descriptive information about the entity of interest; and
display the entity of interest and one or more of the determined attributes on a device.

2. The system of claim 1, wherein the plurality of sensors comprises a plurality of internal sensors and a plurality of external sensors.

3. The system of claim 2, wherein the plurality of external sensors is associated with one or more of a camera, a fitness tracker, a security system, or a video game console, and wherein the plurality of internal sensors comprises one or more of a microphone, an accelerometer, a camera, a proximity sensor, a pedometer, or a global positioning system (GPS).

4. The system of claim 1, wherein the entity engine is further adapted to store indicators of one or more of the entities of the plurality of identified entities in a log associated with the user of the at least one computer.

5. The system of claim 4, wherein each indicator is associated with a time when the indicated entity was identified and a location where the indicated entity was identified.

6. The system of claim 1, wherein the entity engine is further adapted to receive one or more of the plurality of rules.

7. The system of claim 1, wherein the entity engine is further adapted to determine the descriptive information about the entity of interest from at least one of global entity data or user entity data.

8. The system of claim 1, wherein the entity engine adapted to identify the plurality of entities from the sensor data comprises the entity engine adapted to identify the plurality of entities from the sensor data using the sensor data, one or more previously identified entities and previously received sensor data.

9. The system of claim 1, wherein the entity engine is implemented on one or both of the at least one computing device or a cloud computing platform.

10. A system for automatically identifying entities based on sensor data and for providing attributes based on the identified entities, the system comprising:
an entity engine adapted to:
receive sensor data from a plurality of sensors of a device;
identify a plurality of entities from the sensor data;
determine an entity of interest of the plurality of entities by scoring each of the plurality of entities and selecting the entity with the highest score as the entity of interest, wherein the scoring is based on at least one of user query data or global query data, wherein the user query data includes a history of queries associated with a user of the device, and wherein the global query data includes a history of queries associated with a plurality of users other than the user;
determine attributes associated with the entity of interest, wherein the attributes comprise descriptive information about the entity of interest; and
display the entity of interest and one or more of the determined attributes on the device.

11. The system of claim 10, wherein the entity engine is further adapted to:
receive user input associated with the user of the device; and
determine the entity of interest of the plurality of entities based on the user input.

12. The system of claim 10, wherein the entity engine is further adapted to:
store a plurality of rules, wherein each rule is associated with an entity and an action;
determine one or more rules of the plurality of rules that match an entity of the plurality of entities; and
perform the action associated with at least one of the determined one or more rules.

13. The system of claim 12, wherein the action comprises one or more of generating an alarm, generating a notification, performing an internet search, performing a text-to-speech translation, finding a location, and performing a financial transaction.

14. The system of claim 10, wherein the device comprises one or more of a smart phone, a laptop, desktop, or a tablet computer, and the plurality of sensors comprise one or more of a microphone, an accelerometer, a camera, a proximity sensor, a pedometer, and a global positioning system (GPS).

15. A method for automatically identifying entities based on sensor data and for determining attributes associated with the identified entities, the method comprising:
collecting sensor data from one or more sensors of a plurality of sensors associated with a device by the device;
identifying a plurality of entities from the sensor data by the device;
receiving user input by the device;
determining one or more entities of interest from the plurality of entities based on the received user input by the device and by scoring each of the plurality of entities and selecting the entity with the highest score as the entity of interest, wherein the scoring is based on at least one of user query data or global query data, wherein the user query data includes a history of queries associated with a user of the device, and wherein the global query data includes a history of queries associated with a plurality of users other than the user;
determining a query based on the received user input by the device;
determining attributes associated with the one or more entities of interest based on the query by the device, wherein the attributes comprise descriptive information about the one or more entities of interest; and
displaying the one or more entities of interest and one or more attributes of the determined attributes on a display associated with the device by the device.

16. The method of claim 15, further comprising storing indicators of one or more of the entities of the plurality of identified entities in a log associated with the user of the device.

17. The method of claim 16, wherein each indicator is associated with a time when the indicated entity was identified and a location where the indicated entity was identified.

18. The method of claim 15, wherein identifying the plurality of entities from the sensor data comprises identifying the plurality of entities from the sensor data using the sensor data, one or more previously identified entities, and previously received sensor data.

19. The method of claim 15, further comprising:
   determining one or more rules of a plurality of rules that match an entity of the plurality of entities; and
   performing an action associated with each rule that is determined to match an entity of the plurality of entities.

20. The method of claim 15, wherein the query is a select, project, join, union, and aggregation (SPJUA) query.

* * * * *